United States Patent
De et al.

(10) Patent No.: US 11,705,986 B2
(45) Date of Patent: Jul. 18, 2023

(54) HARDWARE BASED CYCLIC REDUNDANCY CHECK (CRC) RE-CALCULATOR FOR TIMESTAMPED FRAMES OVER A DATA BUS

(71) Applicant: Synopsys, Inc., Mountain View, CA (US)

(72) Inventors: Jishnu De, Ghaziabad (IN); Jaspreet Singh Gambhir, Surrey (CA); Jitendra Puri, New Delhi (IN)

(73) Assignee: Synopsys, Inc., Mountain View, CA (US)

( * ) Notice: Subject to any disclaimer, the term of this patent is extended or adjusted under 35 U.S.C. 154(b) by 6 days.

(21) Appl. No.: 17/566,305

(22) Filed: Dec. 30, 2021

(65) Prior Publication Data

US 2022/0209889 A1    Jun. 30, 2022

Related U.S. Application Data

(60) Provisional application No. 63/132,921, filed on Dec. 31, 2020.

(51) Int. Cl.
*H04L 1/00* (2006.01)
*H04L 1/20* (2006.01)
*H04L 1/1867* (2023.01)

(52) U.S. Cl.
CPC .......... *H04L 1/0041* (2013.01); *H04L 1/0045* (2013.01); *H04L 1/188* (2013.01); *H04L 1/201* (2013.01)

(58) Field of Classification Search
CPC ... H04L 1/0041; H04L 1/0045; H04L 1/0061; H04L 1/188; H04L 1/201
See application file for complete search history.

(56) References Cited

U.S. PATENT DOCUMENTS

| | | | | |
|---|---|---|---|---|
| 6,038,694 A | * | 3/2000 | Swallow | H04L 1/0061 714/781 |
| 7,310,766 B2 | * | 12/2007 | Gallagher | H04L 1/0061 714/776 |
| 2004/0090994 A1 | * | 5/2004 | Lockridge | H04N 21/4305 375/E7.278 |

* cited by examiner

*Primary Examiner* — Shelly A Chase
(74) *Attorney, Agent, or Firm* — Lowenstein Sandler LLP

(57) ABSTRACT

A method and a system for correcting cyclic redundancy check (CRC) for a frame with last bytes changed are provided. The method includes acquiring a data frame, calculating a CRC of a modified data frame, and determining a corrected CRC for the data frame based on at least the CRC of the modified data frame and a CRC correction field calculated on the bytes to be replaced at the end of the frame. An altered data frame includes the data frame with a number of last bytes of the data frame replaced with new bytes.

20 Claims, 10 Drawing Sheets

HARDWARE BASED CYCLIC REDUNDANCY CHECK (CRC) RE-CALCULATOR FOR TIMESTAMPED FRAMES OVER A DATA BUS

RELATED APPLICATION

The present application claims the benefit under 35 U.S.C. § 119(e) of U.S. Provisional Patent Application No. 63/132,921 filed on Dec. 31, 2020, which is incorporated herein by reference in its entirety for all purposes.

TECHNICAL FIELD

The present disclosure relates to electronic design automation. In particular the present disclosure is related to a hardware based cyclic redundancy check (CRC) re-calculator for timestamped frames over a data bus.

BACKGROUND

Ethernet port designs are becoming larger and faster with speeds ranging from 10 Mbps to 800 Gbps. Traffic flowing through Ethernet ports has undergone evolution in flow control with standards like priority-based flow control (PFC). To comply with the standards, chips are tested for runtime performance during a verification process in addition to testing that a packet is transmitted and received correctly. An end-to-end transmission delay has to be within specification-agreeable limits for chips to pass verification.

There are several factors that can affect performance in a chip. The factors may change during runtime. Thus, a large number of packets (in the order of millions) are processed during the verification process to get an analysis on the chip's performance. A simulation test bench may have difficulties running the verification process due to the number of packets to process.

SUMMARY

In one aspect, a method includes acquiring a data frame, and calculating a cyclic redundancy check (CRC) of a modified data frame. The modified data frame includes the data frame with a number of last bytes of the data frame set to zero. The method further includes calculating a CRC correction field from data bytes to be replaced in the number of the last bytes of the data frame and determining a corrected CRC for the data frame based on at least the CRC of the modified data frame and the CRC correction field.

In one aspect, a system includes a memory storing instructions and a processor, coupled with the memory and to execute the instructions. The processor is configured to acquire a data frame, calculate a CRC of a modified data frame, determine a CRC correction field from data bytes to be replaced in the number of the last bytes of the data frame, and determine a corrected CRC for the data frame based on the CRC of the modified data frame and CRC correction field.

DETAILED DESCRIPTION

Aspects of the present disclosure relate to a hardware based cyclic redundancy check (CRC) re-calculator for timestamped frames over a data bus.

The present disclosure describes Ethernet switch device under test (DUT) verification. The verification includes a software traffic generator feeding traffic to the DUT in an emulator with a transactor according to some embodiments described herein. The transactor functions as a bridge between the software test generator and DUT in the hardware emulator. The transactor may be implemented by software and hardware and provides an interface between the software test generator and the DUT.

In some embodiments, a timestamp is inserted into an Ethernet frame in order to determine an end-to-end transmission delay. However, the timestamp may affect a packet integrity check used in a verification process as described further below. The packet integrity check may include a CRC. Thus, the CRC may be corrected using the approaches described herein.

Embodiments disclosed herein solve the problems of failure to correct the CRC in a single clock cycle, failure to correct the CRC due a difference in configurations between a time clock used for the timestamp and a data clock domain, and the decrease in performance due to the additional footprint used to correct for the CRC as described further below.

In some embodiments, the data frame may be modified by inserting zero (e.g., 0x00) in a number of the last bytes of the data frame. The CRC corresponding to the modified frame may be determined and the corrected CRC may be determined based on the CRC of the modified frame and the timestamp. A correction module may be coupled to a CRC evaluator. The correction module may implement two exclusive OR operations to correct the CRC.

Advantages of the present disclosure include, but are not limited to, correcting for the CRC for frame that includes a timestamp in a single clock cycle without affecting the performance of the emulator. In addition, the additional logic (correction module) used to correct the CRC has a small footprint.

Figure 1:
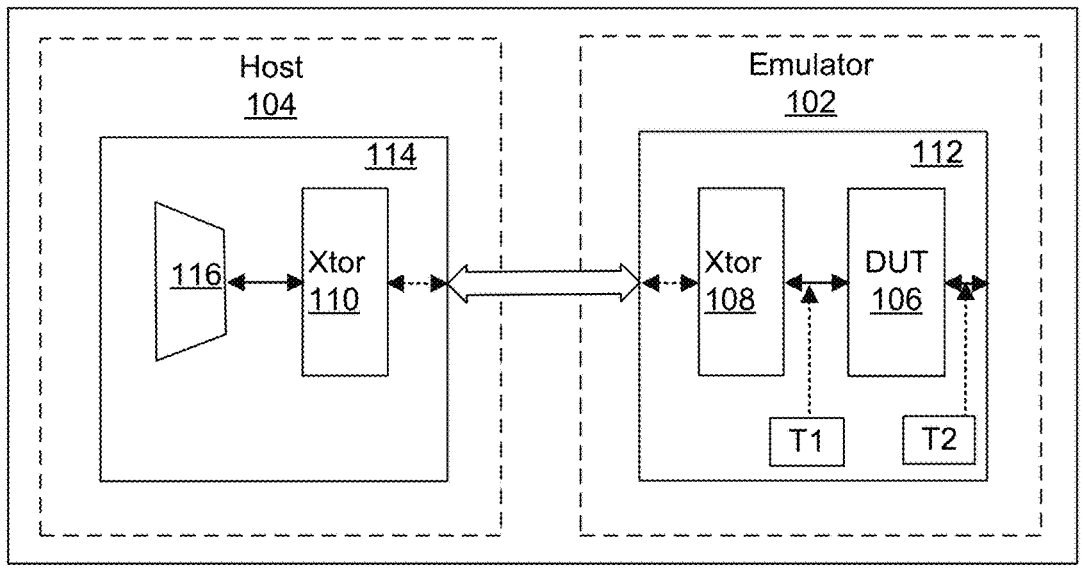
FIG. 1 is a diagram that illustrates a verification setup with latency calculation in accordance with some embodiments.

FIG. 1 illustrates a block diagram for a verification setup with latency calculation in accordance with some embodiments. The verification may include sending a packet from a host 104 to an emulator 102 and sending the packet back from emulator 102 to host 104. Emulator 102 may include a hardware test bench 112. Host 104 may include a software test bench 114. Host 104 may communicate with emulator 102 via a transactor connecting software test bench 114 and hardware test bench 112. The transactor may include a hardware component 108 and a software component 110. The transactor may be an Ethernet transactor. Host 104 may include a software test generator 116 that includes one or more processors. Software test generator 116 may run one or more tests for a DUT 106.

The transactor may offer timestamping of packets to measure a packet delay (i.e., latency) in DUT 106. The packet delay may be measured from an input of DUT 106 (from the hardware component 108 of the transactor) and an output of DUT 106 (e.g., to an application layer).

Timestamping may be performed using a shared clock (CT) between the transactor and DUT 106. When the first byte of a frame of the packet is being sent on a line (between hardware component 108 of the transactor and DUT 106), the transactor may snapshot the current time (T1) with reference to the CT and replace the last n-bytes (e.g., 8-bytes) of the frame with the value of T1. When the DUT's application output detects the first byte of the frame, it may snapshot the current time (T2) with reference to the CT. The packet delay may be calculated as T2−T1. T1 is extracted from the last n-bytes of the frame and T2−T1 is determined. T2−T1 can be converted to units of time by multiplying (T2−T1) with a time-period of the CT.

To perform the verification mentioned above, a CRC may be performed. CRC is a packet integrity check that is part of a packet sent on the wire or data bus. In some embodiments, every frame used for data validation is wrapped with a 32-bit CRC.

Figure 2:
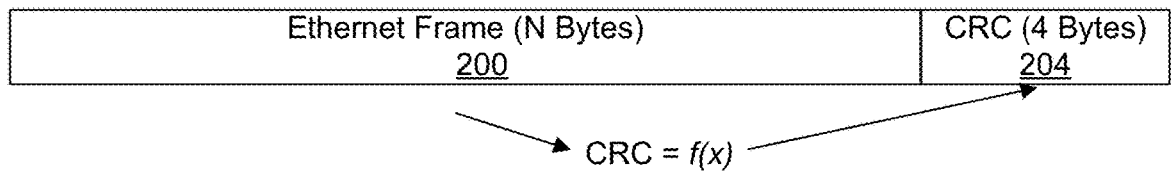
FIG. 2 is a diagram that illustrates representations of cyclic redundancy check (CRC) calculation over an Ethernet frame in accordance with some embodiments.

FIG. 2 is a diagram that illustrates representations of CRC calculation for an Ethernet frame 200 in accordance with some embodiments. A packet 202 may include Ethernet frame 200 and a CRC portion 204. CRC portion 204 may be generated by a CRC generator. The CRC generator is a unique 32-bit generator that takes as its input the entire frame 200 that is to be sent on the wire or the data bus and generates CRC portion 204.

As mentioned above, the timestamping feature of the transactor may change the last 8 bytes of the Ethernet frame 200 by replacing the n-bytes (e.g., 8-bytes) with the timestamping data. Changing the last 8-bytes of the frames 200 causes the CRC portion 204 of the frame to change. Accordingly, after insertion of the timestamp data to the Ethernet frame 200, the CRC may be recalculated to correct the CRC of the modified frame.

A hardware component of the Ethernet transactor may calculate a corrected CRC of the modified frame. The transactor may comply with a customer desire for high performing emulators to enable running a large number of packets in a relatively quick time.

A data width of the IP may be selected to be 1024-bits to support speeds of 800G and beyond. An Ethernet frame of 64 bytes may start and end in a same clock cycle (with 128 bytes input in one clock cycle). Starting and ending the Ethernet frame in the same clock cycle may lead to a complication because the frame has to be timestamped and its CRC re-calculated in the same clock cycle. A CRC engine may process an incoming frame byte by byte. With 128 bytes being fed in a single clock cycle, the CRC engine may be large and may take at least two clock cycles to evaluate the CRC. Thus, a problem arise when the CRC has to be re-calculated in a single clock cycle for frame that start and end in the same clock cycle while the CRC engine uses a minimum of two clock cycles. There may not be any clock in the system faster than the 1024-bit clock. The presence of another faster clock that is otherwise not used by the system (other than timestamping) may slow down the system.

Large hardware combinatorial logic may not be inserted in a circuit between two clocks. Because, emulation performance is slowed down by the work of the circuit between two clock edges. Further, there is a desire to avoid a lot of substantial and complex logic. As the transactor is an enabler, it may use less space (e.g., gate count) leaving the rest of the gate count for the DUT to fit in.

In some embodiments, the hardware implementation of the timestamping feature in the Ethernet transactor may achieve timestamping with CRC re-calculation with all the above described features (i.e., implemented over 1024-bit bus using the same clock that may be clocking the 1024-bit data bus without using another faster clock) without any overhead. The hardware implementation adds combinatorial logic that may be less than the longest combinatorial logic present in the system. Accordingly, the added logical footprint is minimal.

As mentioned above, to perform validation, a CRC value for a frame may be determined. A frame check sequence (FCS) is a 32-bit CRC value that encapsulates the Ethernet frame. This value is determined as a function of the contents of protected fields of the Ethernet frame. The protected fields may include a destination address, a source address, a length/type field, a MAC client data, and pad (that is, all fields except the FCS). The encoding is defined by the following generating polynomial:

$$G(x)=x^{32}+x^{26}+x^{23}+x^{22}+x^{16}+x^{12}+x^{11}+x^{10}+x^{8}+x^{7}+x^{5}+x^{4}+x^{2}+x+1 \quad \text{Equation (1)}$$

In some embodiments, CRC computation (32-bit CRC) for the 1024-bit data path may be implemented using a parallel CRC method. In the parallel CRC method, a circuit may be devised to calculate the CRC for an 'n'-bit parallel data input based on the current pre-loaded value in the CRC register.

The CRC-32 equation for 8-bit CRC parallel evaluator may be expressed as:

CRC[0]=$D$[1]^$D$[7]^$C$[30]^$C$[24]

CRC[1]=$D$[0]^$D$[1]^$D$[6]^$D$[7]^$C$[31]^$C$[30]^$C$[25]^$C$[24]

CRC[2]=$D$[0]^$D$[1]^$D$[5]^$D$[6]^$D$[7]^$C$[31]^$C$[30]^$C$[26]^$C$[25]^$C$[24]

CRC[3]=$D$[0]^$D$[4]^$D$[5]^$D$[6]^$C$[31]^$C$[27]^$C$[26]^$C$[25]

CRC[4]=$D$[1]^$D$[3]^$D$[4]^$D$[5]^$D$[7]^$C$[30]^$C$[28]^$C$[27]^$C$[26]^$C$[24]

CRC[5]=$D$[0]^$D$[1]^$D$[2]^$D$[3]^$D$[4]^$D$[6]^$D$[7]^$C$[31]^$C$[30]^$C$[29]^$C$[28]^$C$[27]^$C$[25]^$C$[24]

CRC[6]=$D$[0]^$D$[1]^$D$[2]^$D$[3]^$D$[5]^$D$[6]^$C$[31]^$C$[30]^$C$[29]^$C$[28]^$C$[26]^$C$[25]

$CRC[7]=D[0]\hat{}D[2]\hat{}D[4]\hat{}D[5]\hat{}D[7]\hat{}C[31]\hat{}C[29]\hat{}C[27]\hat{}C[26]\hat{}C[24]$ $CRC[8]=D[3]\hat{}D[4]\hat{}D[6]\hat{}D[7]\hat{}C[28]\hat{}C[27]\hat{}C[25]\hat{}C[24]$ $CRC[9]=D[2]\hat{}D[3]\hat{}D[5]\hat{}D[6]\hat{}C[29]\hat{}C[28]\hat{}C[26]\hat{}C[25]$ $CRC[10]=D[2]\hat{}D[4]\hat{}D[5]\hat{}D[7]\hat{}C[29]\hat{}C[27]\hat{}C[26]\hat{}C[24]$ $CRC[11]=D[3]\hat{}D[4]\hat{}D[6]\hat{}D[7]\hat{}C[28]\hat{}C[27]\hat{}C[25]\hat{}C[24]$ $CRC[12]=D[1]\hat{}D[2]\hat{}D[3]\hat{}D[5]\hat{}D[6]\hat{}D[7]\hat{}C[30]\hat{}C[29]\hat{}C[28]\hat{}C[26]\hat{}C[25]\hat{}C[24]$ $CRC[13]=D[0]\hat{}D[1]\hat{}D[2]\hat{}D[4]\hat{}D[5]\hat{}D[6]\hat{}C[31]\hat{}C[30]\hat{}C[29]\hat{}C[27]\hat{}C[26]\hat{}C[25]$ $CRC[14]=D[0]\hat{}D[1]\hat{}D[3]\hat{}D[4]\hat{}D[5]\hat{}C[31]\hat{}C[30]\hat{}C[28]\hat{}C[27]\hat{}C[26]$ $CRC[15]=D[0]\hat{}D[2]\hat{}D[3]\hat{}D[4]\hat{}C[31]\hat{}C[29]\hat{}C[28]\hat{}C[27]$ $CRC[16]=D[2]\hat{}D[3]\hat{}D[7]\hat{}C[29]\hat{}C[28]\hat{}C[24]$ $CRC[17]=D[1]\hat{}D[2]\hat{}D[6]\hat{}C[30]\hat{}C[29]\hat{}C[25]$ $CRC[18]=D[0]\hat{}D[1]\hat{}D[5]\hat{}C[31]\hat{}C[30]\hat{}C[26]$ $CRC[19]=D[0]\hat{}D[4]\hat{}C[31]\hat{}C[27]$ $CRC[20]=D[3]\hat{}C[28]$ $CRC[21]=D[2]\hat{}C[29]$ $CRC[22]=D[7]\hat{}C[24]$ $CRC[23]=D[1]\hat{}D[6]\hat{}D[7]\hat{}C[30]\hat{}C[25]\hat{}C[24]$ $CRC[24]=D[0]\hat{}D[5]\hat{}D[6]\hat{}C[31]\hat{}C[26]\hat{}C[25]$ $CRC[25]=D[4]\hat{}D[5]\hat{}C[27]\hat{}C[26]$ $CRC[26]=D[1]\hat{}D[3]\hat{}D[4]\hat{}D[7]\hat{}C[30]\hat{}C[28]\hat{}C[27]\hat{}C[24]$ $CRC[27]=D[0]\hat{}D[2]\hat{}D[3]\hat{}D[6]\hat{}C[31]\hat{}C[29]\hat{}C[28]\hat{}C[25]$ $CRC[28]=D[1]\hat{}D[2]\hat{}D[5]\hat{}C[30]\hat{}C[29]\hat{}{}^4C[26]$ $CRC[29]=D[0]\hat{}D[1]\hat{}D[4]\hat{}C[31]\hat{}C[30]\hat{}C[27]$ $CRC[30]=D[0]\hat{}D[3]\hat{}C[31]\hat{}C[28]$ $CRC[31]=D[2]\hat{}C[29]$ Equation (2)

where CRC is the 32-bit CRC output, D is the 8-bit data input, C is a preloaded CRC register initialized to an initial value (e.g., FF FF FF FF).

Figure 3:
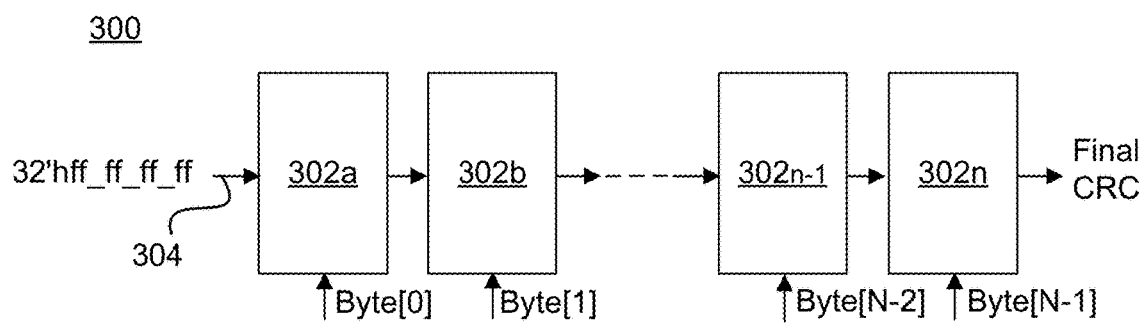
FIG. 3 is a diagram of a daisy chained N-byte CRC evaluator using 8-bit CRC evaluators in accordance with some embodiments.

FIG. 3 is a diagram that shows a CRC evaluator 300, in accordance with an embodiment of the present disclosure. CRC evaluator 300 may be a daisy chain n-byte CRC evaluator. CRC evaluator 300 may include a plurality of 8-bit CRC evaluators 302a, 302b, . . . 302n−1, 302n. The plurality of 8-bit CRC evaluators may implement equation (2) for the 8-bit CRC parallel evaluator described above. The preloaded CRC register value for node 'n' is the output CRC of node 'n−1' (where 0<=n<N). A first node 304 in the chain may be preloaded with a CRC value of an unsigned integer as an initial value (e.g., FF FF FF FF).

As with 8-bit parallel evaluators, corresponding equations may be generated for parallel evaluators for 8-bit, 16-bit, 24-bit, 32-bit, 40-bit, 48-bit, 56-bit, 64-bit, 128-bit, 192-bit, 256-bit, 320-bit, 384-bit, 448-bit, 512-bit, 576-bit, 640-bit, 704-bit, 768-bit, 832-bit, 896-bit, 960-bit, and 1024-bit data. While creating parallel evaluators, equations may be reduced via Boolean simplification from their corresponding daisy chained versions.

The reduced equations may still be long that results in long combinational paths to evaluate the CRC in one clock cycle. Long combinational paths may adversely affect the performance of the emulator. Accordingly, one or more evaluators listed above may be broken into two parts to reduce the combinatorial path. A first part may evaluate the data XORs and a second part may take the data XOR output and evaluate CRC with a preloaded CRC register.

In some embodiments, equation 2 described above for 8-bit CRC evaluator may be broken into the following equation (Equation 3):

$DX[31]=D[1]\hat{}D[7]$ $DX[30]=D[0]\hat{}D[1]\hat{}D[6]\hat{}D[7]$ $DX[29]=D[0]\hat{}D[1]\hat{}D[5]\hat{}D[6]\hat{}D[7]$ $DX[28]=D[0]\hat{}D[4]\hat{}D[5]\hat{}D[6]$ $DX[27]=D[1]\hat{}D[3]\hat{}D[4]\hat{}D[5]\hat{}D[7]$ $DX[26]=D[0]\hat{}D[1]\hat{}D[2]\hat{}D[3]\hat{}D[4]\hat{}D[6]\hat{}D[7]$ $DX[25]=D[0]\hat{}D[1]\hat{}D[2]\hat{}D[3]\hat{}D[5]\hat{}D[6]$ $DX[24]=D[0]\hat{}D[2]\hat{}D[4]\hat{}D[5]\hat{}D[7]$ $DX[23]=D[3]\hat{}D[4]\hat{}D[6]\hat{}D[7]$ $DX[22]=D[2]\hat{}D[3]\hat{}D[5]\hat{}D[6]$ $DX[21]=D[2]\hat{}D[4]\hat{}D[5]\hat{}D[7]$ $DX[20]=D[3]\hat{}D[4]\hat{}D[6]\hat{}D[7]$ $DX[19]=D[1]\hat{}D[2]\hat{}D[3]\hat{}D[5]\hat{}D[6]\hat{}D[7]$ $DX[18]=D[0]\hat{}D[1]\hat{}D[2]\hat{}D[4]\hat{}D[5]\hat{}D[6]$ $DX[17]=D[0]\hat{}D[1]\hat{}D[3]\hat{}D[4]\hat{}D[5]$ $DX[16]=D[0]\hat{}D[2]\hat{}D[3]\hat{}D[4]$ $DX[15]=D[2]\hat{}D[3]\hat{}D[7]$ $DX[14]=D[1]\hat{}D[2]\hat{}D[6]$ $DX[13]=D[0]\hat{}D[1]\hat{}D[5]$ $DX[12]=D[0]\hat{}D[4]$ $DX[11]=D[3]$ $DX[10]=D[2]$ $DX[9]=D[7]$ $DX[8]=D[1]\hat{}D[6]\hat{}D[7]$ $DX[7]=D[0]\hat{}D[5]\hat{}D[6]$ $DX[6]=D[4]\char`\^D[5]$ $DX[5]=D[1]\char`\^D[3]\char`\^D[4]\char`\^D[7]$ $DX[4]=D[0]\char`\^D[2]\char`\^D[3]\char`\^D[6]$ $DX[3]=D[1]\char`\^D[2]\char`\^D[5]$ $DX[2]=D[0]\char`\^D[1]\char`\^D[4]$ $DX[1]=D[0]\char`\^D[3]$ $DX[0]=D[2]$ $CRC[0]=DX[31]\char`\^C[30]\char`\^C[24]$ $CRC[1]=DX[30]\char`\^C[31]\char`\^C[30]\char`\^C[25]\char`\^C[24]$ $CRC[2]=DX[29]\char`\^C[31]\char`\^C[30]\char`\^C[26]\char`\^C[25]\char`\^C[24]$ $CRC[3]=DX[28]\char`\^C[31]\char`\^C[27]\char`\^C[26]\char`\^C[25]$ $CRC[4]=DX[27]\char`\^C[30]\char`\^C[28]\char`\^C[27]\char`\^C[26]\char`\^C[24]$ $CRC[5]=DX[26]\char`\^C[31]\char`\^C[30]\char`\^C[29]\char`\^C[28]\char`\^C[27]\char`\^C[25]\char`\^C[24]$ $CRC[6]=DX[25]\char`\^C[31]\char`\^C[30]\char`\^C[29]\char`\^C[28]\char`\^C[26]\char`\^C[25]$ $CRC[7]=DX[24]\char`\^C[31]\char`\^C[29]\char`\^C[27]\char`\^C[26]\char`\^C[24]$ $CRC[8]=DX[23]\char`\^C[28]\char`\^C[27]\char`\^C[25]\char`\^C[24]$ $CRC[9]=DX[22]\char`\^C[29]\char`\^C[28]\char`\^C[26]\char`\^C[25]$ $CRC[10]=DX[21]\char`\^C[29]\char`\^C[27]\char`\^C[26]\char`\^C[24]$ $CRC[11]=DX[20]\char`\^C[28]\char`\^C[27]\char`\^C[25]\char`\^C[24]$ $CRC[12]=DX[19]\char`\^C[30]\char`\^C[29]\char`\^C[28]\char`\^C[26]\char`\^C[25]\char`\^C[24]$ $CRC[13]=DX[18]\char`\^C[31]\char`\^C[30]\char`\^C[29]\char`\^C[27]\char`\^C[26]\char`\^C[25]$ $CRC[14]=DX[17]\char`\^C[31]\char`\^C[30]\char`\^C[28]\char`\^C[27]\char`\^C[26]$ $CRC[15]=DX[16]\char`\^C[31]\char`\^C[29]\char`\^C[28]\char`\^C[27]$ $CRC[16]=DX[15]\char`\^C[29]\char`\^C[28]\char`\^C[24]$ $CRC[17]=DX[14]\char`\^C[30]\char`\^C[29]\char`\^C[25]$ $CRC[18]=DX[13]\char`\^C[31]\char`\^C[30]\char`\^C[26]$ $CRC[19]=DX[12]\char`\^C[31]\char`\^C[27]$ $CRC[20]=DX[11]\char`\^C[28]$ $CRC[21]=DX[10]\char`\^C[29]$ $CRC[22]=DX[9]\char`\^C[24]$ $CRC[23]=DX[8]\char`\^C[30]\char`\^C[25]\char`\^C[24]$ $CRC[24]=DX[7]\char`\^C[31]\char`\^C[26]\char`\^C[25]$ $CRC[25]=DX[6]\char`\^C[27]\char`\^C[26]$ $CRC[26]=DX[5]\char`\^C[30]\char`\^C[28]\char`\^C[27]\char`\^C[24]$ $CRC[27]=DX[4]\char`\^C[31]\char`\^C[29]\char`\^C[28]\char`\^C[25]$ $CRC[28]=DX[3]\char`\^C[30]\char`\^C[29]\char`\^C[26]$ $CRC[29]=DX[2]\char`\^C[31]\char`\^C[30]\char`\^C[27]$ $CRC[30]=DX[1]\char`\^C[31]\char`\^C[28]$ $CRC[31]=DX[0]\char`\^C[29]$ where, CRC is the 32-bit CRC output, D is the 8-bit data input, DX is the intermediate data XOR evaluation, and C is a preloaded CRC register initialized to the initial value (e.g., FF FF FF FF).

Figure 4:
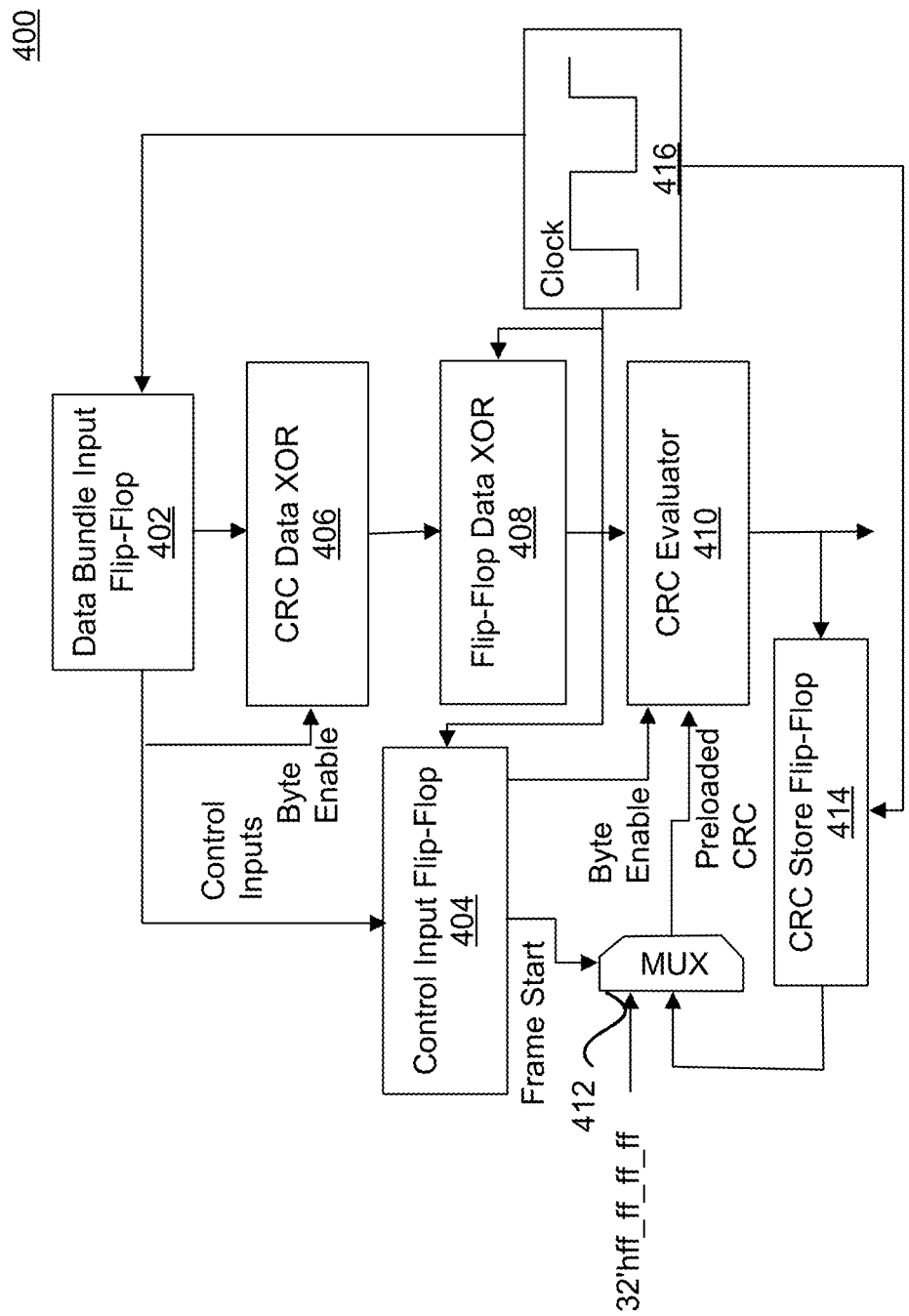
FIG. 4 is a block diagram of a 1024-bit CRC evaluator in accordance with some embodiments.

FIG. 4 is a block diagram of a 1024-bit CRC evaluator 400 in accordance with some embodiments. CRC evaluator 400 may include a data bundle flip-flop 402, a control input flip-flop 404, a CRC data XOR 406, a flip-flop data XOR 408, a CRC evaluator 410, a multiplexer 412, a CRC store flip-flop 414, and a clock 416.

Data bundle flip-flop 402 receives a 1024-bit data bus input from a registered flip-flop with control signals describing one or more attributes of the data (e.g., start of frame, number of bytes valid). CRC data XOR 406 may evaluate the data XOR intermediate output (as explained above) based on the number of bytes valid in the 1024-bit data cycle using a combination of parallel XOR evaluators. CRC data XOR 406 takes in as input a signal "byte enable" that signifies how many bytes in the 1024-bit block is valid.

Control input flip-flop 404 and flip-flop data XOR 408 may be flip-flops that store an output of the CRC data XOR 406 and control data from data bundle input flip-flop 402, respectively. Control data may be a part of the data bundle. This flip-flop configuration implements the 2 parts logic for the 8-bit evaluator in equation 3.

CRC evaluator 404 receives a byte enable signal from control input flip-flop 404, an output from flip-flop data XOR 408, and a pre-loaded CRC from multiplexer 412. The output from flip-flop data XOR 408 represents the XOR evaluated on the data input at a previous clock cycle. The byte enable signal may represent the number of bytes in the 1024-bit data that are valid. The pre-loaded CRC may be the preloaded CRC register input as described in the CRC equations. CRC store flip-flop 414 stores the output of CRC evaluator 410.

An Ethernet frame size may range between 64 bytes to more than 9K bytes. Hence, the CRC over a frame may be evaluated over a single clock cycle or multiple clock cycles. For the start of the CRC calculation in a frame the preloaded CRC register may be initialized to 32'hff_ff_ff_ff. Based on the start of frame input from the data control block, multiplexer 412 may assign 32'hff_ff_ff_ff or the CRC evaluated in the previous cycle as input to CRC evaluator 410 (i.e., stored in the CRC store flip flop 414).

In some embodiments, the Ethernet transactor may run in the emulator that accepts a time clock counter of 64-bits as an input. The timeclock counter may be a rollover 64-bit counter that is clocked with a mutually agreed upon time clock. The mutually agreed upon time clock is shared across an emulation testbench (e.g., hardware test bench 112). Accordingly, a counter value of the time clock counter may be visible at the transactor and the DUT. So, the time calculations in terms of latency may be calculated with respect to this counter.

Figure 5:
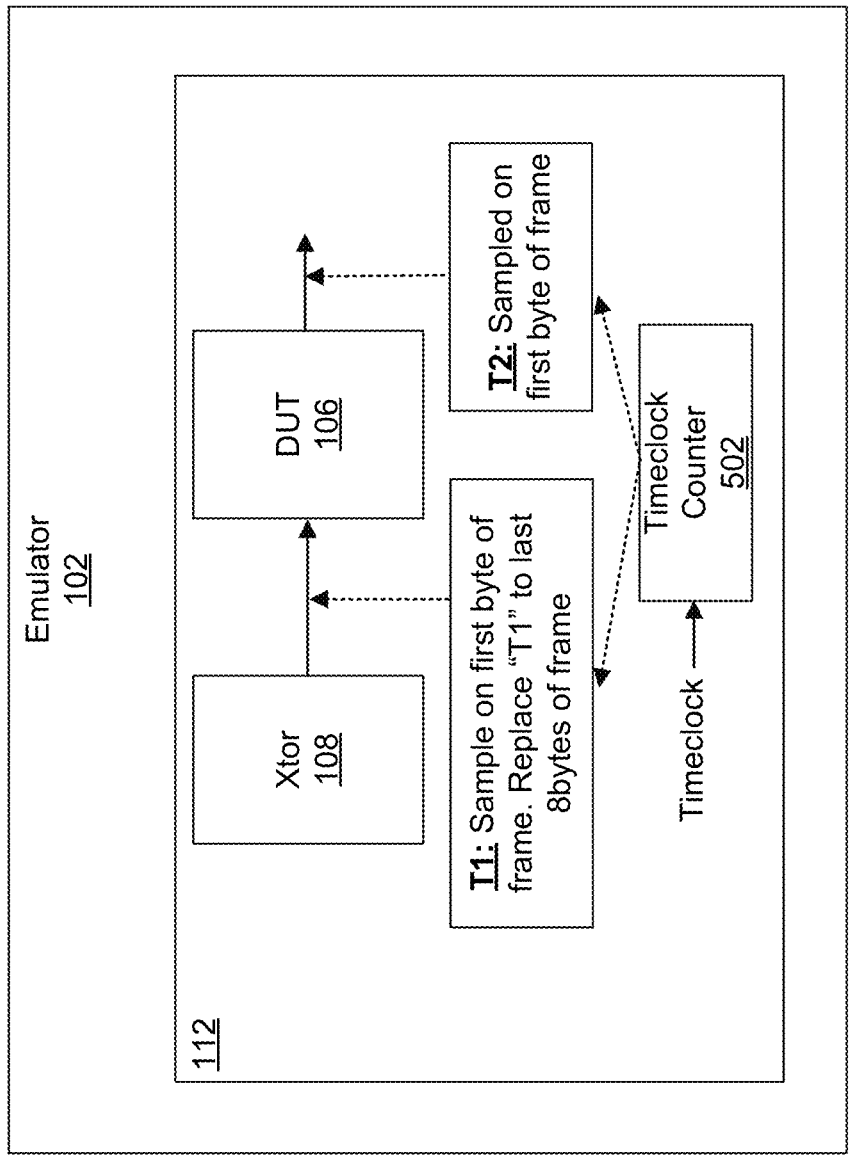
FIG. 5 is a block diagram that illustrates latency calculation with frame timestamping in accordance with some embodiments.

FIG. 5 is a block diagram that illustrates latency calculation with frame timestamping in accordance with some embodiments. The value of a timeclock counter 502 may be sampled by the transactor when the first byte of the frame is sent on the line. The sampled value may be overwritten on the last 8-bytes of the Ethernet frame. Accordingly, the CRC of the Ethernet frame may have to be corrected.

When the first byte of the frame is received on a final application output of DUT 106, the timeclock counter is sampled. The difference between the 64-bit value of the timeclock counter sampled at DUT's application output and the 64-bit value embedded in the Ethernet frame may be the latency of the DUT. The determined latency represents the DUT latency from the input of the DUT connected to the transactor to the application output with respect to the time clock.

Figure 6:
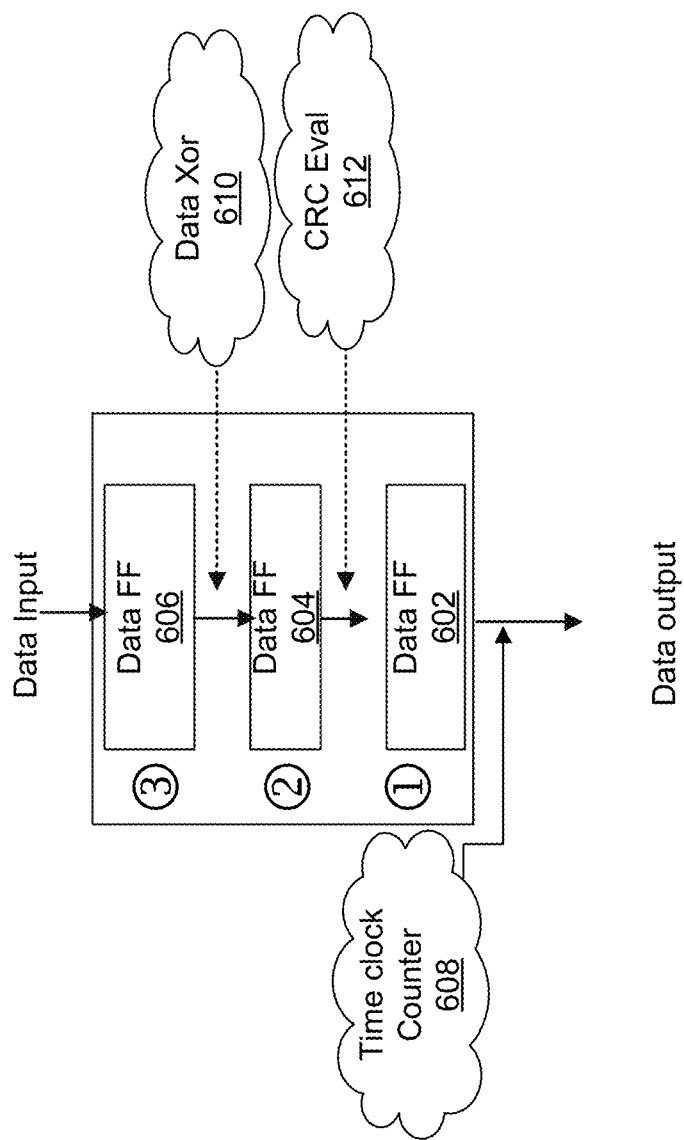
FIG. 6 is a diagram that illustrates data timing relationship with CRC calculation in accordance with some embodiments.

FIG. 6 is a diagram that illustrates data timing relationship with CRC calculation in accordance with some embodiments. The CRC calculation may take two clock cycles to evaluate as per the 1024-bit CRC architecture.

For frame size between 64 to 128 bytes, a time clock counter 608 value may be sampled when the first byte of the frame is transmitted and the last 8 bytes of the frame may be replaced in the same clock, as shown in FIG. 6. Since the CRC evaluation 612 for the frame may have already been completed (i.e., CRC already determined), the CRC for this frame may be incorrect.

For frame size between 129 to 256 bytes, the value may be replaced in the next clock cycle when the time clock counter 608 is sampled when the first byte is sent. The data for the next clock cycle in a data flip-flop 604 may have already been processed for a data XOR output 610 when the frame is sent on the line from a data flip-flop 602. So, the CRC for this frame may be incorrect.

For a frame size of greater than 256 bytes, when the time clock counter is sampled for the frame in data flip-flop 602, the location where the value has to be replaced may be at least in a data flip-flop 606 or beyond.

The frame with the timestamp inserted bytes may be evaluated for correct CRC according to various embodiments described below. Additional hardware solutions may be used are described below to determine the correct CRC.

In a first method, frames with size less than 256 bytes are unable to recalculate CRC as the last 8 bytes of the frame to change are already processed when the time clock counter is sampled. When the frame's first byte is in data flip-flop 606, it may be determined if the frame ends in the current clock cycle or the next clock cycle based on the total size of the frame as determined from the control data. Accordingly, the time clock counter value may be calculated when the frame may be driven on the line. With the counter value calculated, the frame's last 8 bytes may be replaced at data flip-flop 606 to ensure that the correct CRC is calculated with timestamp replaced data.

In the first method, it is assumed that the clock relationship between time clock and the data clock is known. This may however not be the case and these two clocks may have different relationships in different configurations that cannot be predicted. Accordingly, in that case, calculating the time clock counter value from the data clock domain may not be possible.

In a second method, the CRC evaluator for a frame may be broken into two blocks with the CRC output of the first part feeding into the second CRC evaluator. Accordingly, the CRC evaluator may evaluate the frame till the size of the frame minus the timestamping bits. The output of the CRC evaluator may then be fed to a 64-bit CRC evaluator with the timestamp count sampled as the data input. However, the method of CRC calculation till frame minus timestamp may increase the footprint of the design because of the implementation in the hardware for a 1024-bit bus.

In some embodiments, based on different frame sizes, there may be situations where the N-byte frame's 'N-n-'th byte may end one clock cycle before the clock with the 'N'th byte. For example, a frame of size 129 bytes may take two clock cycles to send, but minus the 8 bytes, i.e., 121 bytes may take a single clock cycle. So, the logic feeding the frames to the CRC engine may have to track for N-byte frame's 'N-n'th byte and 'n'-th byte to be on the same or different clock cycles. Based on this, additional logic may be used to synchronize the frame's calculated CRC with the actual frame end and timestamp value input.

The Ethernet transactor may pack multiple frames in a single clock cycle. For example, in a single clock cycle there may be trailing 24 bytes of frame 'n' and 'n+1'th frame of 64 bytes that may start and end in the same clock cycle. This may compound the problem discussed above.

In addition, the timestamping feature in the Ethernet transactor may be controlled per frame via a control input in the data bundle. The bytes manipulation logic, as described above, may be tracked per frame. This may be compounded with the multi-frame in a single clock cycle with independent controls that may increase the design complexity.

In some embodiments, the Ethernet transactor may implement the algorithm described below to correct the CRC of a frame that includes a timestamp.

The CRC evaluation based on the 8-bit CRC evaluator of equation (3) may be expressed as an output of an XOR operation of two terms. The first term may be based on the data input. For example, a first equation may evaluate the 32-bit data XOR dependent on the data input. The second term may be based on the CRC. For example, a second equation may evaluate the CRC transformation based on the input pre-loaded CRC value.

In some embodiments, an 'n' byte CRC evaluator may be expressed as $$CRC(f)=DX(f)\char`\^ CT(n) \quad \text{Equation (4)}$$

where CRC(f) is a function to calculate CRC of a frame, DX(f) is a function to calculate data XOR of a frame, f is a byte stream of 'n' bytes representing the frame, n is a number of bytes in the frame T. The CRC(f) and DX(f) equations may be dependent on the size of the data input.

CRC correction algorithm for timestamp CRC correction problem may be explained using a frame of size 4 bytes, as described herein. However, the CRC correction algorithm is not limited to a frame of size 4 bytes alone.

For example, for a 4-byte frame 'B1-B2-B3-B4', the CRC calculated over this frame is C1. If the last 2 bytes of the frame are changed with bytes T1-T2 the new frame is 'B1-B2-T1-T2', and the CRC of this modified frame is C2. If the frame's last 2 bytes are replaced with 0, the byte string becomes B1-B2-0x00-0x00, and the CRC of this frame is C1. Accordingly, based on equation (4) described above:

$$C1=DX1\char`\^ CT1$$

$$C2=DX2\char`\^ CT2$$

$$C1'=DX1'\char`\^ CT1' \quad \text{Equation (5)}$$

where C1=CRC(B1-B2-B3-B4), C2=CRC(B1-B2-T1-T2), C1'=CRC(B1-B2-0x00-0x00), DX1=DX(B1-B2-B3-B4), DX2=DX(B1-B2-T1-T2), DX1'=DX (B1-B2-0x00-0x00), CT1=CT(4), CT2=CT(4), and CT1'=CT(4).

The value of CT for a 4-byte frame may be the same as the initial CRC loaded register value based on equation (4). The initial CRC loaded value remains unchanged (i.e., 32'hff_ff_ff_ff). Accordingly, $$CT1 = CT2 = CT1' = CT(4) \quad \text{Equation (6)}$$

Equation (6) shows CRC transformation equality. The difference between C1 and C1' may be due to a value change in DX(f). Further, an XOR operation on any bit value with 1'b0 yields the same bit as output. For example, A^1'b0 yields A as an output. Accordingly, at the input 4 byte frame as a string of 32 bits, D[31:0], replacing B3 and B4 by 0x00 means assigning D[31:16] to 0. This evaluation may be the same as removing all entries of D[x], where 'x' is between 31 and 16 in the 4-byte frame equation of DX(f).

DX2 may be calculated using equation (7): DX2=DX1'^DX2', where DX2'=Value to XOR with DX1' for inserting D[31:16]={T2, T1}.

In some embodiments, DX2' may be calculated from the 4-byte DX(f) equation and feeding it a pattern of 0x00-0x00-T1-T2. Accordingly, DX1', D[15:0]=0 may negate its impact on the data XOR value, giving the output as the missing data XOR component of DX2 from DX1' is calculated as follows:

$$DX2' = DX(0x00\text{-}0x00\text{-}T1\text{-}T2) \quad \text{Equation (8)}$$

In some embodiments, once DX2' is known, C2 may be calculated using:

$$C2 = C1'^{\wedge}DX2' \quad \text{Equation (9)}$$

An 'n' byte CRC evaluator may be a daisy chained CRC evaluator with 8-bit evaluators (e.g., CRC evaluator 300 of FIG. 3). In equation (4), if the initial CRC register value is set to 32'h00_00_00_00, the CT(n) component may be 0 and have no impact on CRC. Thus, CRC(f)=DX(f). Accordingly, DX(f) may be evaluated with a daisy chain of 8-bit DX evaluators.

Figure 7:
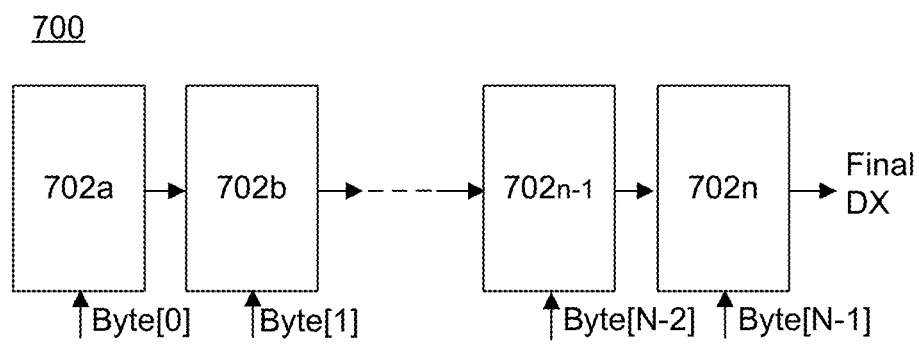
FIG. 7 is a block diagram of daisy chained CRC evaluators in accordance with some embodiments.

FIG. 7 is a block diagram of a daisy chained DX evaluator in accordance with some embodiments. DX evaluator 700 may be a daisy chain n-byte DX evaluator. DX evaluator 700 may include a plurality of 8-bit DX evaluators 702a, 702b, . . . 702n−1, 702n. The plurality of 8-bit DX evaluators may determine DX(f) as described above.

If Byte[0] to Byte[n−3] are set to 0x00, then all the 8-bit DX evaluators (e.g., 702a, 702b) prior to Byte[n−2] may have no impact on the result because all results before n−2 are zero. So, for 'n' bytes, if 'm' is the first non-zero byte (0<m<n), then DX(f)=DX(f) (equation 10), where f is a n-byte frame, f[0:n−1], and f is the frame 'f' discarding the initial zero byte. f[m:n−1] may be used for reduced DX equation for frame with initial bytes 0x00. Then, DX2' may be expressed as:

$$DX2' = DX(T1\text{-}T2) \quad \text{Equation (11)}$$

Therefore, equation (9) defined previously may be rewritten as:

$$C2 = C1'^{\wedge}DX(T1\text{-}T2) \quad \text{Equation (12)}$$

Equation (12) may be used for calculating C2 with the reduced DX2.

The above steps may be extended for the use-case of Ethernet frames with timestamp insertion. For the frame requiring timestamping, the last 8-bytes may be written as 0x00 before the frame enters the CRC evaluators. This may be done in a software portion of the transactor (e.g., software component 110). Then, the CRC may be evaluated on the frame without any change. When the frame's first byte is sent on the line, the time clock counter may be sampled. The data XOR for the 8-byte time counter value may be evaluated with the 64-bit parallel evaluator. The data XOR may be XOR-ed with the CRC output of the frame to get the correct CRC as follows:

$$CRC(F') = CRC(F)^{\wedge}DX(T) \quad \text{Equation (13)}$$

where F' is an Ethernet frame of 'n' bytes with timestamp data inserted, F is an Ethernet frame of 'n' bytes with last 8 bytes equal to zero (e.g., 0x00), and T is 8-byte timeclock counter sampled when the first byte of the frame is sent.

Figure 8:
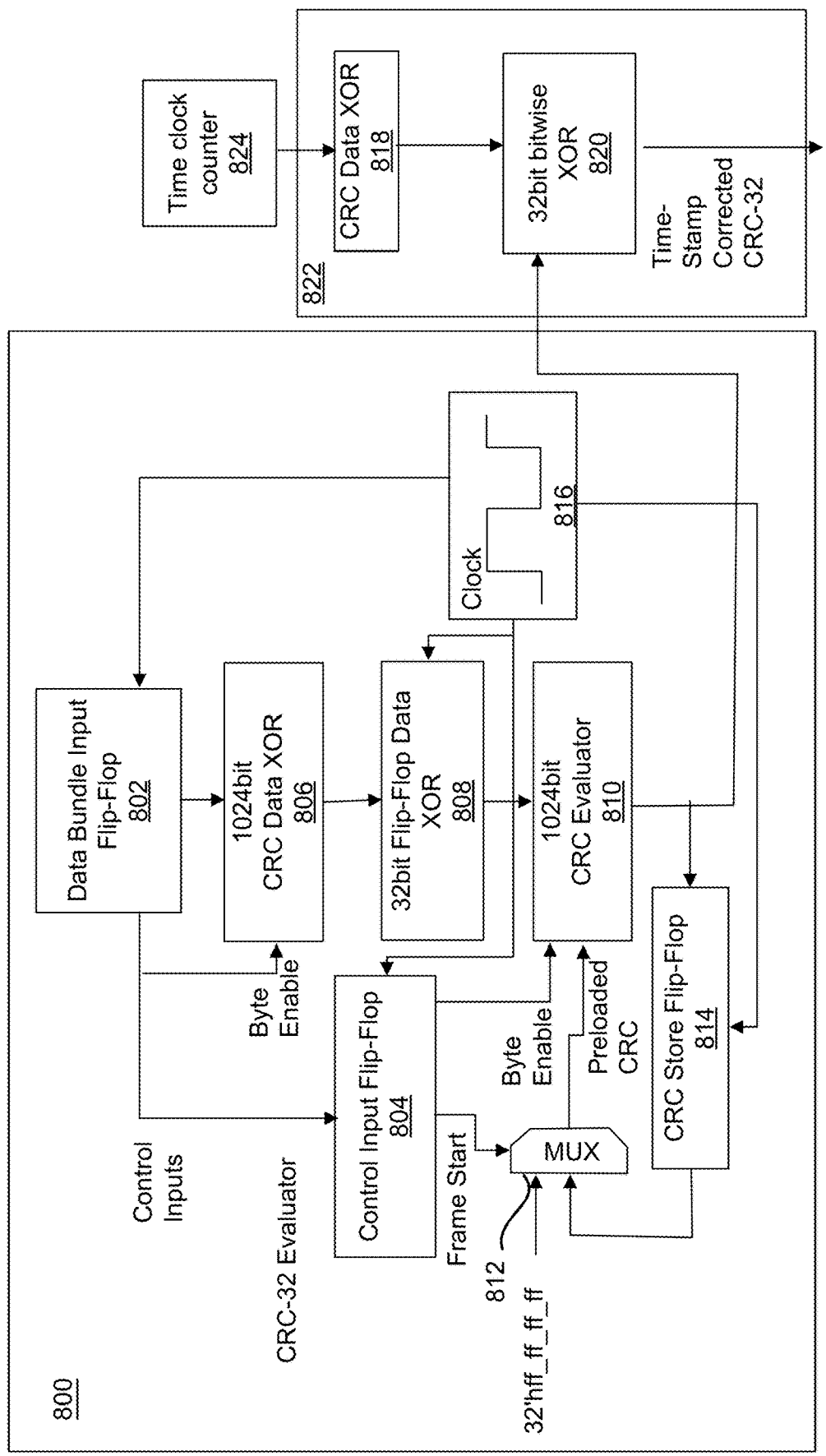
FIG. 8 is a block diagram for a hardware implementation for timestamped frame CRC correction in accordance with some embodiments.

FIG. 8 is a block diagram of a CRC evaluator 800 with a CRC correction module 822, in accordance with some embodiments. CRC evaluator 800 may include a data bundle flip-flop 802, a control input flip-flop 804, a CRC data XOR 806, a flip-flop data XOR 808, a CRC evaluator 810, a multiplexer 812, a CRC store flip-flop 814, and a clock 816. Data bundle flip-flop 802, control input flip-flop 804, CRC data XOR 806, flip-flop data XOR 808, CRC evaluator 810, multiplexer 812, CRC store flip-flop 814, and clock 816 may have similar structures and functions as data bundle flip-flop 402, control input flip-flop 404, CRC data XOR 406, flip-flop data XOR 408, CRC evaluator 410, multiplexer 412, CRC store flip-flop 414, and clock 816 described in relation with FIG. 4.

It should be appreciated that any of the structures and functions described in reference to FIG. 4 may also be included in embodiments referencing FIG. 8. Unless otherwise noted, elements of FIG. 8 that have similar reference numbers (e.g., reference numbers sharing the two right-most numeric digits) as elements of FIG. 4 may have similar structures and functions.

Figure 9:
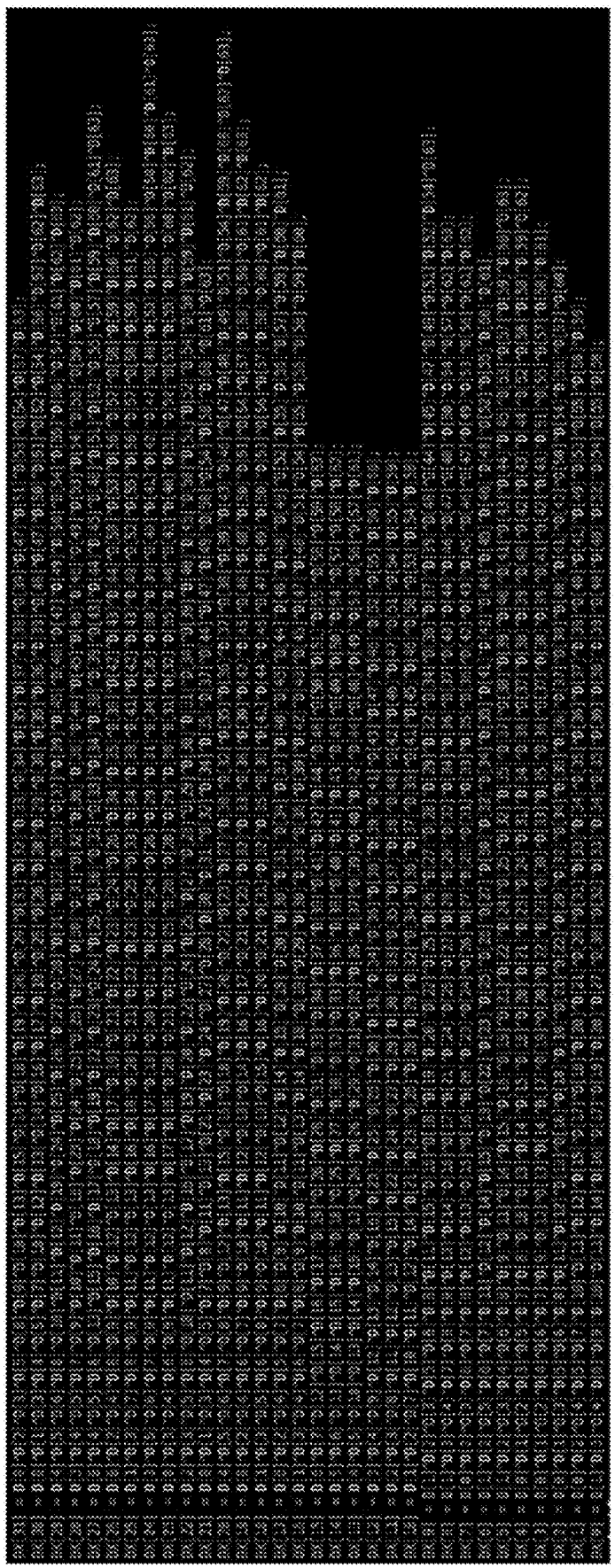
FIG. 9 is a schematic that illustrates 64-bit data XOR evaluator in accordance with some embodiments.

In order to perform CRC correction, CRC correction module 824 is coupled to an output of CRC evaluator 810. CRC correction module 822 may receive an input from time clock counter 824. CRC correction module 822 may include a CRC data XOR 818 and a 32-bitwise XOR 820. A 32-bit bitwise XOR 820 is performed between the output from the CRC data XOR 818 and 32-bit bitwise XOR 820. An exemplary equation for 64-bit data XOR evaluator 818 is shown in FIG. 9.

The method of CRC recalculation according to embodiments described herein may not add logic to conventional CRC evaluators. The complex machinery of the CRC engine may run as-is for regular or timestamp inserted frames. This takes away the complexities of the logic trying to filter frames with timestamping enabled in flight in a multi-frame clock cycle. The only additional logic that may be added for CRC correction is the 64-bit parallel data XOR evaluator and the conditional bitwise XOR of the calculated CRC with the data XOR corrector based on timestamping in the frame is enabled. Since the correction logic is small, the CRC correction may be possible in a single clock cycle. For a frame less than 256 bytes in size, the CRC for the frame may be corrected in the same clock cycle. Thus, the performance of the emulator is maintained with minimal area usage.

Figure 10:
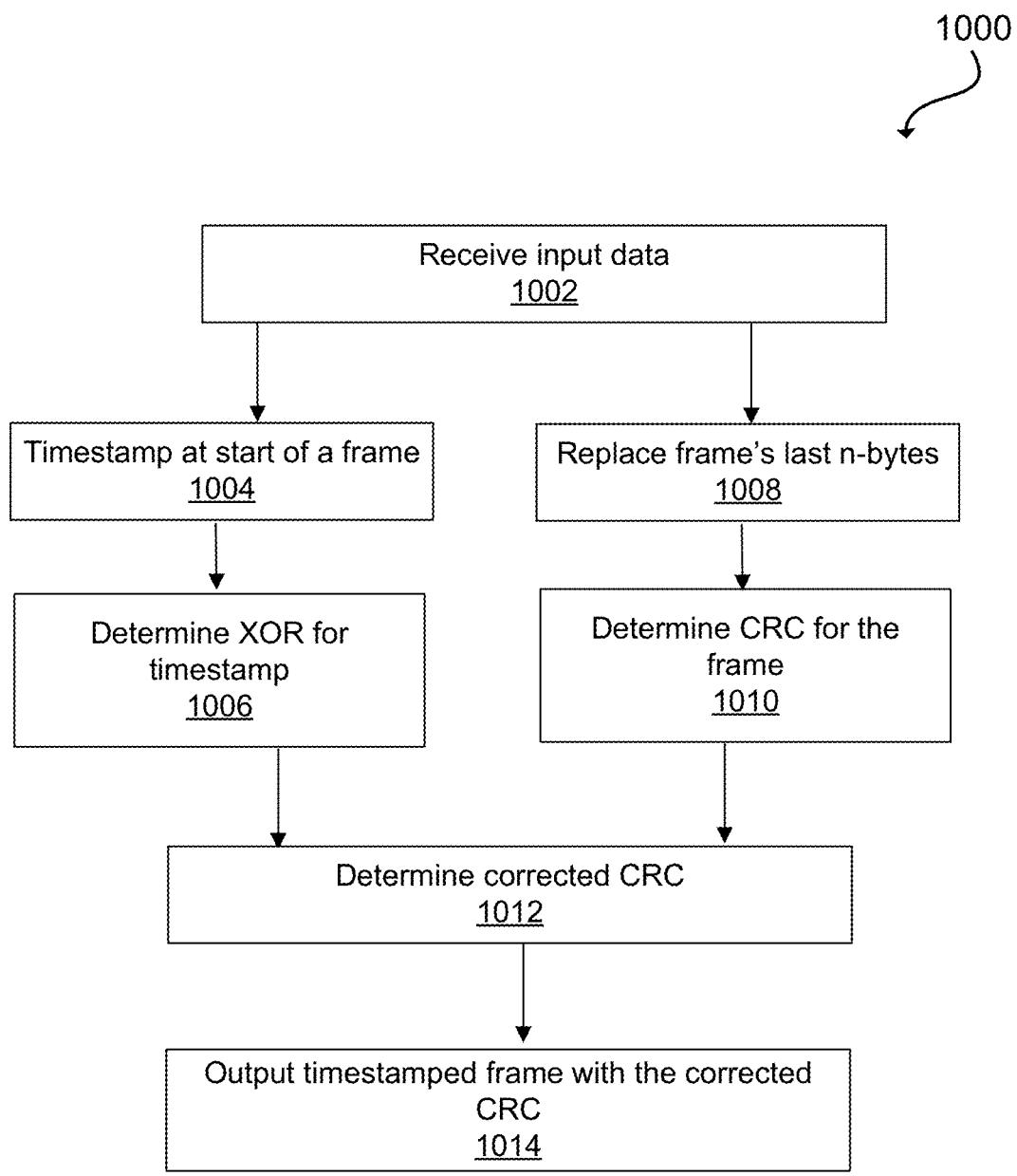
FIG. 10 is a flowchart for a method for cyclic redundancy check in accordance with some embodiments.

FIG. 10 is a flowchart for a method 1000 for cyclic redundancy check in accordance with some embodiments. In 1002, input data may be received. For example, the input data may be received by the DUT of an emulator. In 1004, a timestamp is determined at the start of a frame. In 1006, a CRC correction field is calculated. The CRC correction field maybe based on data bytes that are to replace the last bytes of the data frame. In some aspects, the data bytes may correspond to the timestamp. In some embodiments, an initial seed for the CRC may be set to zero (e.g., 0x00). In 1008, the last n-bytes of the frame are replaced with zero. In one example, n is equal to 8 and the last 8 bytes are replaced by zero. In 1010, a CRC corresponding to the modified frame in 1008 is determined. In some aspects, an initial seed is set to FF FF FF FF. At 1012, a corrected CRC is determined. The corrected CRC may be determined by applying a XOR operation between the CRC corresponding to the modified frame and the CRC corresponding to the timestamp.

In 1014, the timestamped frame with the corrected CRC is output. The timestamped frame corresponds to the frame with the last n-bytes replaced with the timestamp. In some embodiments, the timestamped frame is transmitted with the corrected CRC is transmitted via a data bus.

In some embodiment, a CRC check for the data frame may be performed using the corrected CRC.

Figure 11:
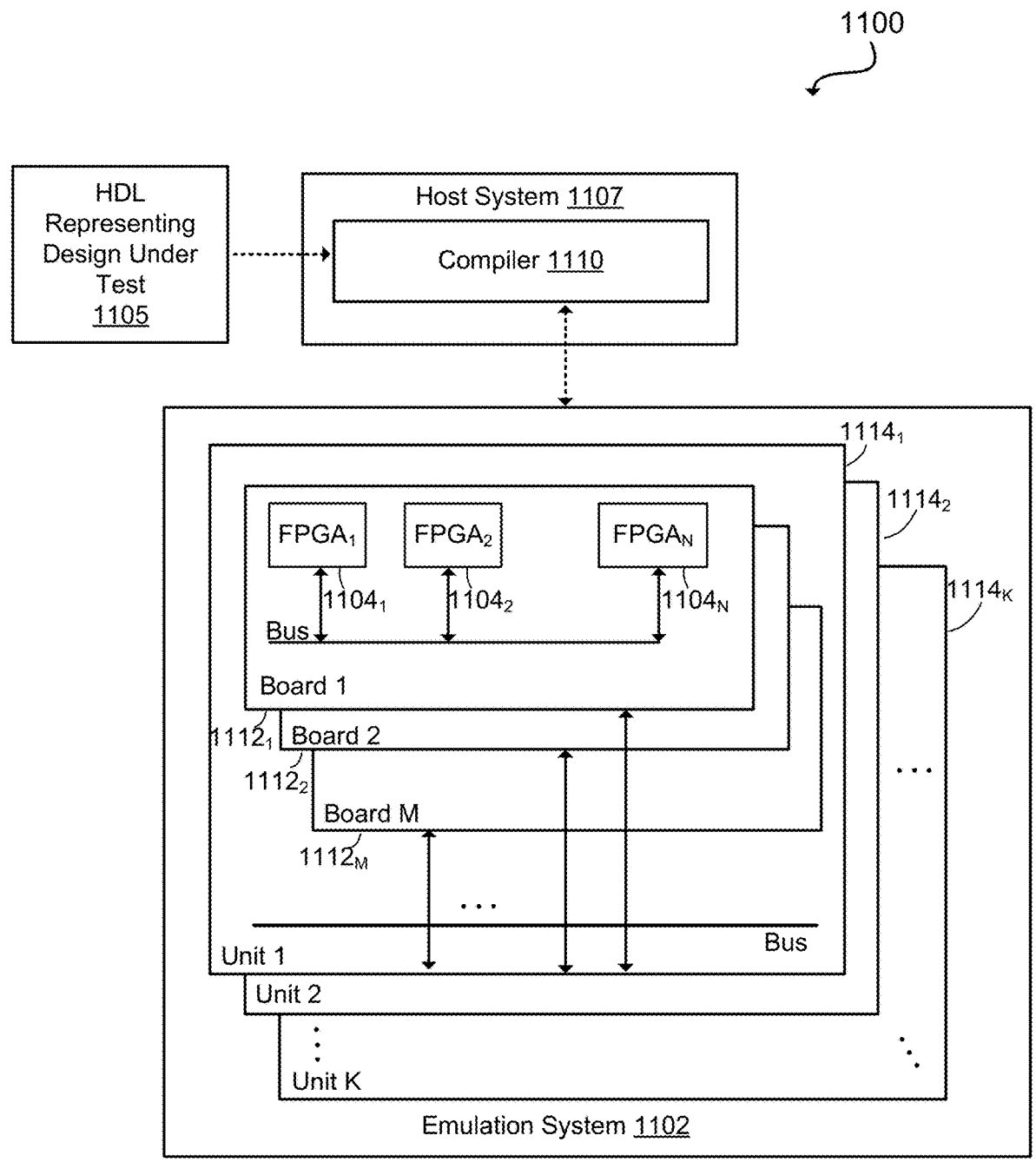
FIG. 11 illustrates a diagram of an example emulation system in accordance with some embodiments of the present disclosure.

FIG. 11 depicts a diagram of an example emulation environment 1100. An emulation environment 1100 may be configured to verify the functionality of the circuit design. The emulation environment 1100 may include a host system 1107 (e.g., a computer that is part of an EDA system) and an emulation system 1102 (e.g., a set of programmable devices such as Field Programmable Gate Arrays (FPGAs) or processors). The host system generates data and information by using a compiler 1110 to structure the emulation system to emulate a circuit design. A circuit design to be emulated is also referred to as a Design Under Test ('DUT') where data and information from the emulation are used to verify the functionality of the DUT.

The host system 1107 may include one or more processors. In the embodiment where the host system includes multiple processors, the functions described herein as being performed by the host system can be distributed among the multiple processors. The host system 1107 may include a compiler 1110 to transform specifications written in a description language that represents a DUT and to produce data (e.g., binary data) and information that is used to structure the emulation system 1102 to emulate the DUT. The compiler 1110 can transform, change, restructure, add new functions to, and/or control the timing of the DUT.

The host system 1107 and emulation system 1102 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 1107 and emulation system 1102 can exchange data and information through a third device such as a network server.

The emulation system 1102 includes multiple FPGAs (or other modules) such as FPGAs $1104_1$ and $1104_2$ as well as additional FPGAs to $1104_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 1102 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks can also include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $1104_1$-$1104_N$ may be placed onto one or more boards $1112_1$ and $1112_2$ as well as additional boards through $1112_M$. Multiple boards can be placed into an emulation unit $1114_1$. The boards within an emulation unit can be connected using the backplane of the emulation unit or any other types of connections. In addition, multiple emulation units (e.g., $1114_1$ and $1114_2$ through $1114_K$) can be connected to each other by cables or any other means to form a multi-emulation unit system.

For a DUT that is to be emulated, the host system 1107 transmits one or more bit files to the emulation system 1102. The bit files may specify a description of the DUT and may further specify partitions of the DUT created by the host system 1107 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 1107 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 1107 and/or the compiler 1110 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 1105 into gate level logic. For a DUT that is to be emulated, the design synthesizer sub-system receives a description of the DUT. If the description of the DUT is fully or partially in HDL (e.g., RTL or other level of abstraction), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 12:
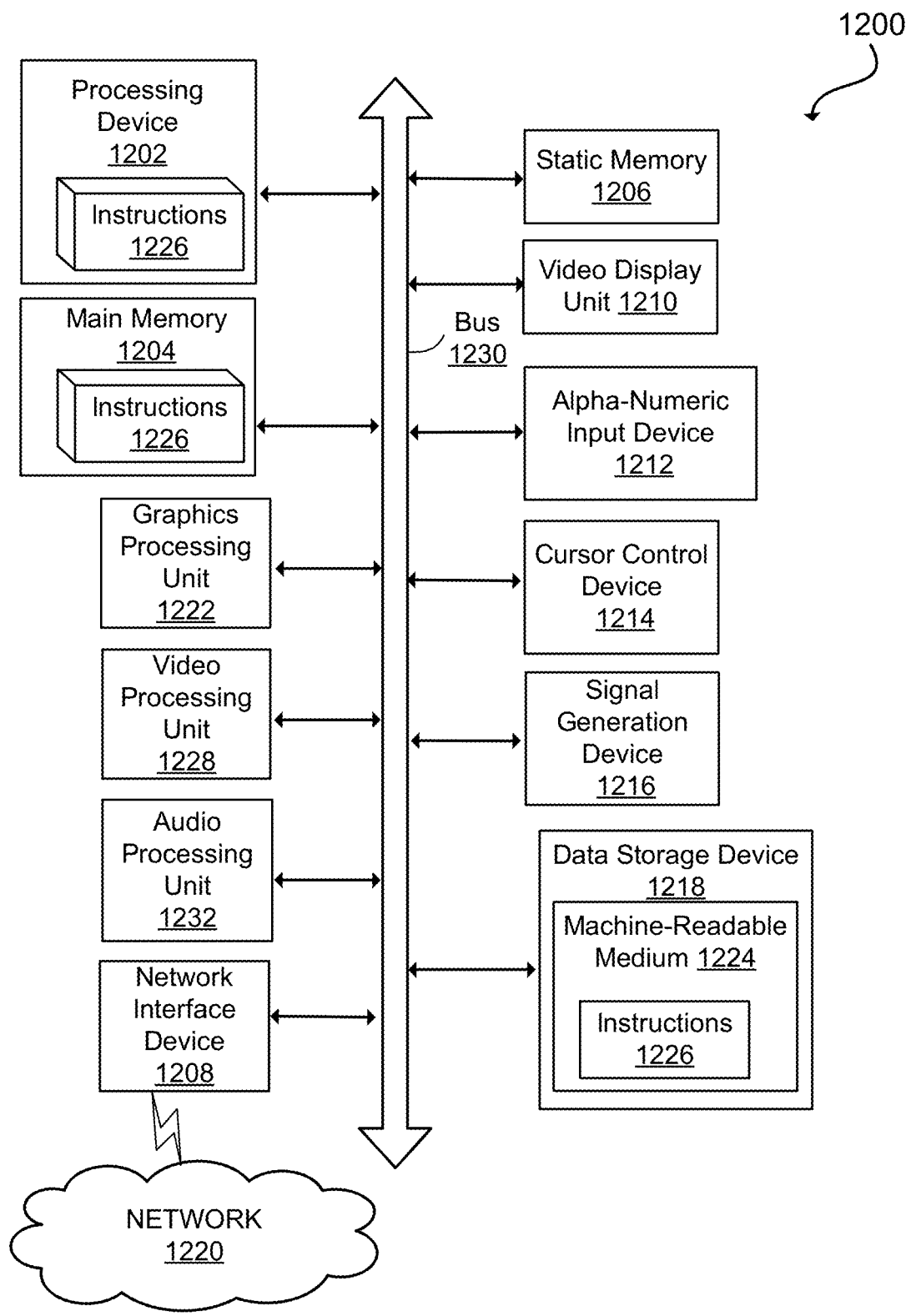
FIG. 12 illustrates a diagram of an example computer system in which embodiments of the present disclosure may operate.

FIG. 12 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230.

Processing device 1202 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In some implementations, the instructions 1226 include instructions to implement functionality corresponding to the present disclosure. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1202 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those that physically manipulate physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for cyclic redundancy check (CRC) calculation, the method comprising:
   acquiring a data frame;
   calculating, using a processor, a CRC of a modified data frame, wherein the modified data frame comprises the data frame with a number of last bytes of the data frame set to zero;
   calculating a CRC correction field from data bytes to be replaced in the number of the last bytes of the data frame; and
   determining a corrected CRC for the data frame based on at least the CRC of the modified data frame and the CRC correction field.

2. The method of claim 1, wherein determining the CRC correction field comprises:
   performing a first CRC data exclusive OR (XOR) operation for the data bytes that reflects a transmission time that is being transmitted, wherein determining the corrected CRC for the data frame comprises performing a second data XOR operation of the output of the first CRC data XOR operation and the CRC of the modified data frame.

3. The method of claim 2, further comprising:
   setting an initial seed to zero for an CRC data XOR evaluator.

4. The method of claim 1, further comprising:
   determining a transmission time by sampling a time clock counter when a first byte of the data frame is transmitted; and
   altering the data frame by replacing the last bytes of the data frame with the transmission time.

5. The method of claim 4, further comprising:
   transmitting the altered data frame and the corrected CRC via a data bus.

6. The method of claim 1, wherein the number of last bytes is equal to eight and the method further comprising:
   replacing the last 8 bytes of the data with zero.

7. The method of claim 1, wherein the data frame is an Ethernet frame.

8. A system comprising:
   a memory storing instructions; and
   a processor, coupled with the memory and to execute the instructions, the instructions when executed cause the processor to:
   acquire a data frame,
   calculate a CRC of a modified data frame, wherein the modified data frame comprises the data frame with a number of last bytes of the data frame set to zero, determine a CRC correction field from data bytes to be replaced in the number of the last bytes of the data frame, and determine a corrected CRC for the data frame based on the CRC of the modified data frame and CRC correction field.

9. The system of claim 8, wherein the processor is further configured to:

perform a first CRC data exclusive OR (XOR) operation for the data bytes that reflects a transmission time that is being transmitted; and perform a second data XOR operation of the output of the first data XOR operation and the CRC of the modified data frame.

10. The system of claim 9, wherein the processor is further configured to:

set an initial seed to zero for an CRC data XOR evaluator.

11. The system of claim 8, wherein the processor is further configured to:

determine a transmission time by sampling a time clock counter when a first byte of the data frame is transmitted; and alter the data frame by replacing the last bytes of the data frame with the transmission time.

12. The system of claim 11, wherein the processor is further configured to:

transmit the altered data frame and the corrected CRC via a data bus.

13. The system of claim 8, wherein the number of last bytes is equal to eight and the processor is further configured to:

replace the last 8 bytes of the data with zero.

14. The system of claim 8, wherein the data frame is an Ethernet frame.

15. A non-transitory computer readable medium comprising stored instructions, which when executed by a processor, cause the processor to:

acquire a data frame;

calculate a CRC of a modified data frame, wherein the modified data frame comprises the data frame with a number of last bytes of the data frame set to zero;

determine a CRC correction field from data bytes to be replaced in the number of the last bytes of the data frame; and determine a corrected CRC for the data frame based on the CRC of the modified data frame and CRC correction field.

16. The non-transitory computer readable medium of claim 15, wherein the processor is configured to:

perform a first CRC data exclusive OR (XOR) operation for the data bytes that reflects a transmission time that is being transmitted; and perform a second data XOR operation of the output of the first data XOR operation and the CRC of the modified data frame.

17. The non-transitory computer readable medium of claim 16, wherein the processor is configured to:

set an initial seed to zero for an CRC data XOR evaluator.

18. The non-transitory computer readable medium of claim 15, wherein the processor is configured to:

determine a transmission time by sampling a time clock counter when a first byte of the data frame is transmitted; and alter the data frame by replacing the last bytes of the data frame with the transmission time.

19. The non-transitory computer readable medium of claim 18, wherein the processor is configured to:

transmit the altered data frame and the corrected CRC via a data bus.

20. The non-transitory computer readable medium of claim 15, wherein the data frame is an Ethernet frame.

* * * * *